United States Patent Office 3,560,828
Patented Feb. 2, 1971

3,560,828
D.C. MOTOR CONTROL SYSTEM
Kazutsugu Kobayashi, Kadoma-shi, and Hisayuki Matsumoto, Moriguchi-shi, Japan, assignors to Matsushita Electric Industrial Co., Ltd., Osaka, Japan
Filed July 3, 1967, Ser. No. 650,879
Int. Cl. H02p 5/16
U.S. Cl. 318—345                                  2 Claims

ABSTRACT OF THE DISCLOSURE

A D-C motor control system comprising a bridge circuit, a reference voltage means, an amplifying means, a power source and a power control transistor. The bridge circuit is formed by a D-C motor and three resistors. The temperature coefficient of the electric resistance of the first resistor is essentially similar to that of the armature winding of the D-C motor and the coefficients of the second and third resistors are essentially similar to each other. The amplifying means is connected to said bridge circuit and controls the conductivity of the power control transistor which makes it possible for the D-C motor to rotate at a substantially constant speed.

BACKGROUND OF THE INVENTION

Field of the invention

This invention relates to electronic systems for controlling the operation of a D-C motor, and more particularly it relates to a D-C motor control system which reduces wow and flutter.

A recent development in the electronic industry has required a D-C motor capable of rotating at a constant speed regardless of any variation in the load or the ambient temperature. Said motor must also be capable of being easily controlled. For instance, a tape recorder or a record player can use such a D-C motor as a driving source. Such a D-C motor is required to rotate at a constant speed and must be capable of making wow and flutter very small.

Prior art

A D-C motor is usually constructed in a bridge circuit to make the rotating speed of the D-C motor constant; that is, the D-C motor forms an arm of the balanced bridge circuit. The back electromotive force of the D-C motor is detected and compared with a reference voltage and the difference voltage is applied to some means so as to control the speed of the D-C motor through a feed back loop. However when the load or the ambient temperature, etc. changes, the speed of the D-C motor also changes.

A conventional method for obtaining speed control would contain, for example, a thermistor or a coil inserted in an arm of the bridge circuit so as to compensate for a variation in the resistance of the D-C motor owing to a temperature change. However, this means can not compensate perfectly. Furthermore, according to the conventional method, there is another problem of the undesirable effect of the high frequency components of the back electromotive force owing to the ripple caused by the rotation of the D-C motor. In order to use a D-C motor in a tape recorder or record player, etc. a D-C motor control system is required which will keep the speed of the D-C motor constant and will eliminate the wow and flutter of the D-C motor. In addition, it is desirable that the D-C motor be compact and suitable for mass-production. There have been various known D-C motor control systems which satisfy the various individual requirements. However, there is no D-C motor control system available which satisfies all of the above requirements at the same time.

SUMMARY OF THE INVENTION

Therefore, an object of the invention is to provide a D-C motor control system comprising a bridge circuit for detecting the back electromotive force of the D-C motor and a transistor circuit forming a feedback loop for using the signal detected by said bridge circuit.

Another object of the invention is to provide a D-C motor control system capable of keeping the speed of the D-C motor constant regardless of any variation in the load applied to the D-C motor.

Another object of the invention is to provide a D-C motor control system capable of keeping the speed of the D-C motor almost exactly constant regardless of any variation in the ambient temperature.

Another object of the invention is to provide a D-C motor control system capable of being easily adjusted by using a bridge circuit.

Another object of the invention is to provide a D-C motor control system which reduces wow and flutter and which can be used as a driving source for musical instruments such as a tape recorder, record player, etc.

Still another object of the invention is to provide a D-C motor control system constructed as compactly as possible and which at the same time is more suitable for mass production than the present systems.

In order to obtain tthe above mentioned objective the invention employs a D-C motor control system comprising a bridge circuit, a reference voltage means and an amplifying means, a power source and a power control transistor. The bridge circuit is formed by a D-C motor and three resistors. The temperature coefficient of the electric resistance of the first resistor is essentially similar to that of the armature winding of the D-C motor and the coefficient of the second and third resistors are essentially similar to each other. The amplifying means is connected to said bridge circuit and controls the conductivity of the power control transistor which makes it possible for the D-C motor to rotate at a substantially constant speed.

DESCRIPTION OF THE PREFERRED EMBODIMENT

The novel D-C motor control system comprises a bridge circuit having for its arms a D-C motor 4, a first resistor 1, a second resistor 2, and a third resistor 3; said D-C motor 4, said first resistor 1, said second resistor 2 and said third resistor 3 being connected in a series circuit loop and in the rectited order. Said D-C motor 4 comprises an armature on which an armature winding is wound, and is provided with a magnetic field having a nearly constant flux density.

The flux density of the magnetic field is nearly constant, and therefore the back electromotive force (back E.M.F.) induced in said armature winding is nearly proportional to the rotational speed of the D-C motor. Accordingly, the extent of the back E.M.F. represents the extent of the rotational velocity, and if the back E.M.F. is controlled to have a constant value at all times, the revolutional velocity is also controlled to have a substantially constant speed at all times.

Figure 1:
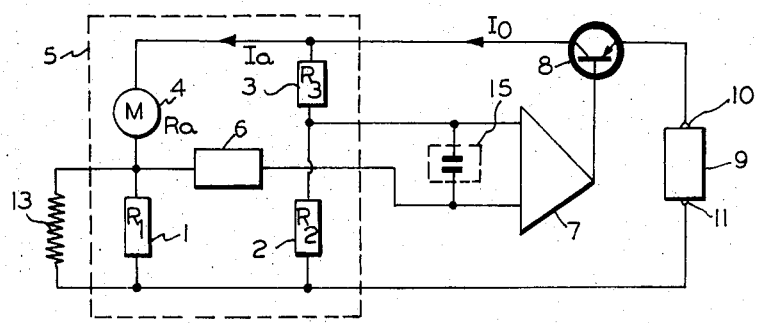
FIG. 1 is a circuit diagram illustrating the first embodiment of the D-C motor control system according to the invention.

Referring to FIG. 1, the dotted line designated by reference numeral 5 shows the bridge circuit. The voltage $E_b$ appearing between the terminals across which the back E.M.F. of the bridge is detected (that is, between the terminal connected to the junction point of the D-C motor 4 and the first resistor 1 and between the terminal connected to the junction point of the second resistor 2 and the third resistor 3) is defined as follows:

$$E_b = E_a \frac{R_1 + R_2}{R_a + R_1 + R_2 + R_3} + E_0 \left( \frac{1}{1 + \frac{R_a}{R_1}} - \frac{1}{1 + \frac{R_3}{R_2}} \right) \quad (1)$$

wherein $R_a$ is the equivalent internal electric resistance of said D-C motor 4. $E_a$ is the value of the back E.M.F. at some rotating speed, and $R_1$, $R_2$ and $R_3$ are the electric resistances of the three resistors 1, 2 and 3 respectively, $E_0$ is the voltage value supplied between the terminal connected to the junction point of said D-C motor 4 and said third resistor 3 and between the terminal connected to the junction point of said first resistor 1 and said second resistor 2.

When the resistance of the bridge circuit 5 is governed by the following equation:

$$\frac{R_a}{R_1} = \frac{R_3}{R_2} \quad (2)$$

Equation 1 can be written as follows:

$$E_b = E_a \frac{R_1 + R_2}{R_a + R_1 + R_2 + R_3} \quad (3)$$

Generally, $R_a$ and $R_1$ range from a few ohms to a value of several times a multiple of ten, and $R_2$ and $R_3$ range to a few thousand ohms. Under such conditions Equation 3 can be written as follows:

$$E_b = E_a \frac{R_2}{R_2 + R_3} \quad (4)$$

Thus, when the bridge circuit is nearly balanced owing to Equation 2, the voltage $E_b$ between the detecting terminals becomes independent of the voltage $E_0$ supplied to the bridge circuit 5 and is proportional only to the voltage $E_a$ (proportional only to the back E.M.F.) The performance of said D-C motor control system is described as follows:

Referring to FIG. 1, one of the detecting terminals is connected to one of a pair of input terminals of an amplifying means 7 through a reference voltage means 6, and the other detecting terminal is connected directly to the other input terminal of said amplifying means 7. By employing said amplifying means 7, $E_b$ is compared with the reference voltage $E_r$ of said reference voltage means 6 and the error voltage, $E_r - E_b$, is amplified.

The output terminal of said amplifier 7 is connected to the base of the power control pnp type transistor 8 and therefore it follows that the base current of said transistor 8 changes with the output of said amplifying means 7. The emitter of the power control transistor 8 is connected to one of the terminals 10 of the power source 9 and the collector of said transistor 8 is connected to the junction point of the D-C motor 4 and the third resistor 3.

Another terminal 11 of said power source 9 is connected to the junction point of the first resistor 1 and the second resistor 2.

Accordingly, the current flowing in the bridge circuit 5 from the power source 9 corresponds to the collector current $I_0$ of the transistor 8. The bridge circuit 5 is constructed so that most of the collector current flows through the D-C motor 4. This current flowing through the D-C motor 4 is controlled by changing the base current of the transistor 8. That is, if the D-C motor 4 is loaded so that the rotating speed is decreased below the reference rotating speed, then the back E.M.F. detected between the detecting terminals is decreased and the input voltage of the amplifier 7, $E_r - E_b$, is increased.

The increased input voltage is amplified and elevates the base current of the transistor 8 thus increasing the collector current $I_0$ of said transistor 8 and consequently, the current $I_a$ of the D-C motor also increases. Accordingly, the generating torque is increased and the rotating speed becomes close to the original rotating speed.

When the temperature of the D-C motor is changed owing to the self-heating of the D-C motor or to a change in the ambient temperature of said D-C motor, the equivalent internal electric resistance $R_a$ of the D-C motor is changed, and the voltage between the detecting terminals is composed not only of the back E.M.F. but also of a voltage caused by the temperature change. The rotating speed of the D-C motor 4 can not be maintained constant when said voltage is present. Such an undesirable effect of the temperature can be eliminated by replacing the first resistor 1 with a different resistor means having a temperature coefficient of electric resistance similar to that of the equivalent internal D-C resistance of the D-C motor.

An embodiment of this means consists in forming the first resistor 1 from the same materials as those of the armature winding and selecting the second resistor 2 and the third resistor 3 so that they have a temperature coefficient of electric resistance similar to each other.

When the first resistor 1 is formed from the wire comprising the same material as that of the armature winding of the D-C motor 4, said first resistor 1 usually has some inductance. As a result, the impedance of the first resistor 1 increases in a high frequency range and the D-C motor control system generates an undesirable oscillation which is very harmful to the driving source of the musical instruments. It is necessary to make a non-inductive winding. However, such a winding is not suitable for mass-production. One effective way to solve such a problem is to connect an impedance means having a low impedance at a high frequency range in parallel with the first resistor 1 having the inductance. An embodiment of this arrangement, shown in FIG. 1 as one example, has a fourth resistor 13 in parallel with the first resistor 1. The impedance of the fourth resistor 13 is nearly constant even at the high frequency range and the fourth resistor 13 controls the increase in the impedance of the first resistor 1 so as to make the change in the impedance of the first resistor 1 very small. When the resistance value of the fourth resistor 13 is much smaller than that of the first resistor 1, the temperature coefficient of the first resistor 1 becomes small and the temperature characteristic of the balanced bridge circuit 5 becomes imperfect. When the resistance value of the fourth resistor 13 is much larger than that of the first resistor 1, an increase in the impedance of the first resistor 1 at a high frequency range can not be satisfactorily controlled. Therefore, the resistance value of the fourth resistor 13 ranges from a few times larger than the D-C resistance of the first resistor to a resistance which is larger by a factor of several times ten.

Figure 1A:
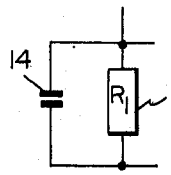
FIG. 1a is a partial circuit diagram illustrating a modified portion of the circuit of FIG. 1.

A modification of the circuit of FIG. 1, as shown in FIG. 1a, comprises a capacitor 14 connected in parallel with the first resistor 1. The capacitance of the capacitor 14 is decided according to the frequency generated at the first resistor 1.

According to this invention, much noise (pulse voltage or A-C voltage having a long period, etc.) is contained in the back E.M.F. detected between the detecting terminals of the D-C motor control system.

If such a noise voltage is applied directly to the amplifying means 7, the accuracy of control of the rotating speed is decreased.

This problem is solved by inserting a filtering impedance means 15 between the input terminals of the amplifier 7 in order to attenuate the noise voltage. A D-C input having a decreased noise voltage is then applied to the input terminals of the amplifying means 7 and the accuracy of control is improved. An embodiment of the filtering impedance means 15 is a capacitor.

In order to keep the temperature of the first resistor 1 essentially the same as that of the D-C motor 4, it is useful to form the first resistor 1 on the armature winding of the D-C motor 4 or to arrange the first resistor 1 close to the motor case—either inside or outside.

In such a D-C motor control system, when the D-C motor is operated at a rather large load, both the armature winding of the D-C motor 4 and the first resistor 1 connected in series with said D-C motor 4 generates a rather large amount of heat. If the armature winding and the first resistor are composed of copper wires, the D-C resistance of both increases owing to the heat. The armature can be cooled during rotation but it is difficult to cool the first resistor 1. Therefore, it is important, in order to obtain a constant speed of rotation, to employ one of the methods described above so that the temperature of the first resistor 1 will coincide to that of the armature winding.

In view of Equation 2 the bridge circuit 5 can be balanced by making one of the resistances of the bridge ($R_a$, $R_1$, $R_2$, $R_3$) a variable resistor. In this case it should be noticed that, as understood from Equations 3 and 4, the back E.M.F. detected between the detecting terminals is defined mainly by the ratio of the electric resistance of the second resistor 2 and the third resistor 3. When the bridge circuit 5 is balanced by means of the second resistor 2 and the third resistor 3, the detected back E.M.F. is considerably different in the balanced and unbalanced stage. This makes it very difficult to set the rotating speed. For this reason, it is desirable, if possible, to set the rotating speed independently of balancing the bridge circuit.

A method of balancing the bridge circuit 5 so as to satisfy such a requirement is to change the ratio of the equivalent electric resistance of the armature $R_a$ and the resistance of the first resistor 1. As understood from Equations 3 and 4, the back E.M.F. detected between the detecting terminals is nearly independent of $R_a$ and the first resistor 1. Therefore, the rotating speed can be kept at a desirable value independently of the balancing of the circuit.

There are two methods for changing the ratio of $R_a$ and $R_1$. One method is to change only the resistance of the first resistor 1 and not to change the point at which the back E.M.F. is detected, and the other method is to make the first resistor 1 a potentiometer and to change the point at which the back E.M.F. is detected. In the latter case, the output terminal of said potentiometer is connected to the reference voltage means, and the bridge circuit 5 is balanced by changing the position of the output terminal of the potentiometer. The equivalent electric resistance of the arm comprising the D-C motor consists not only of $R_a$ but also includes a part of the resistance $R_{p1}$ of the total resistance $R_p$ of the potentiometer, i.e. $R_a + R_{p1}$. The resistance of the arm comprising the first resistor corresponds to the remaining resistance of the potentiometer, i.e. $R_p - R_{p1}$.

Figure 2:
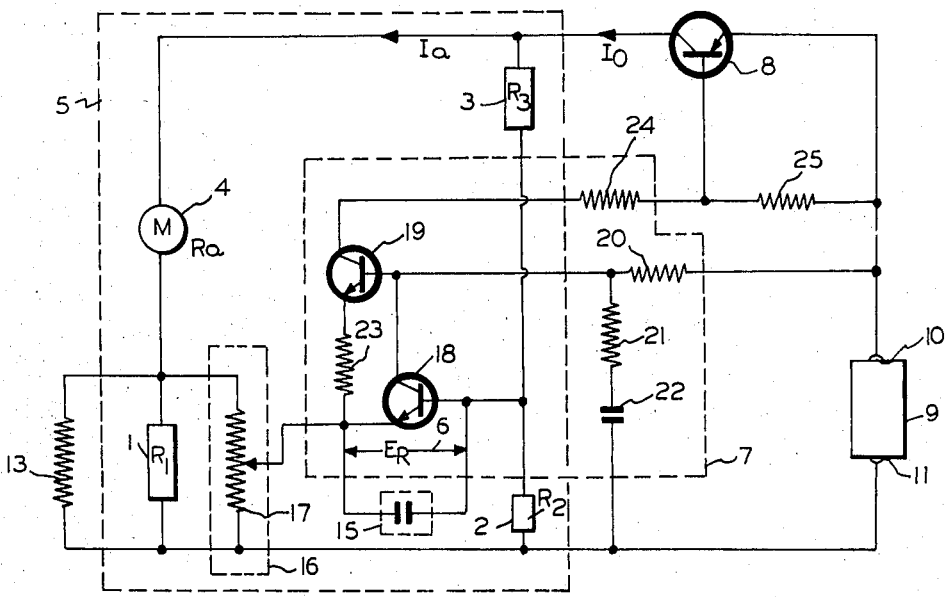
FIG. 2 is a circuit diagram illustrating a second embodiment of the D-C motor control system in accordance with the inventions.

Another method of balancing the bridge is, as shown in FIG. 2, to connect a voltage dividing means 16 in parallel with the first resistor 1. Referring to FIG. 2, the parts, designated by the same reference numerals as in FIG. 1, perform essentially the same functions as do the parts in FIG. 1.

The input terminals of the voltage dividing means 16 are connected in parallel with the first resistor 1, and the output terminal of the voltage dividing means 16 is connected to one of input terminals of the reference voltage means. The voltage across the terminals of the first resistor 1 is divided by the votalge dividing means 16, and the point at which the back E.M.F. is detected changes in such a way as to equivalently change the ratio of $R_a$ and $R_1$.

The voltage dividing means 16 can be a potentiometer. The input terminals of the potentiometer 17 are connected in parallel with the first resistor 1, and the output terminal of the potentiometer 17 is connected to the amplifying means 7 through the reference voltage means. Referring to FIG. 2, the voltage reference means 6 and the amplifying means 7 are constructed as follows; one of the terminals detecting the back E.M.F. of the bridge circuit, i.e. the output terminal of the potentiometer 17, is connected to the emitter of an npn type silicon transistor 18, and the other detecting terminal, i.e. the junction point of the second resistor 2 and the third resistor 3, is connected to the base of said transistor 18. The collector of said transistor 18 is connected to the base of a second npn transistor 19. A fifth resistor 20 is connected between the first terminal 10 of the power source 9, the junction point of the base of said transistor and the collector of the first transistor 18. A series circuit of a sixth resistor 21 and a capacitor 22 is connected between the second terminal 11 of the power source 9 and the junction point of the collector of the first transistor 18 and the base of the second transistor 19. A seventh resistor 23 is connected between the emitter of the second transistor 19 and the output terminal of the potentiometer. An eighth resistor 24 is connected between the collector of the second transistor 19 and the base of the power control transistor 8. A ninth resistor 25 is connected between the emitter and the base of the power control transistor 8. The emitter of the power control transistor 8 is connected to the first terminal 10 of the power source 9, and the collector of said transistor 8 is connected to the junction point of the D-C motor 4 and the third resistor 3. The second terminal 11 of the power source 9 is connected to the junction point of the first resistor 2 and the second resistor 3.

In the circuit construction described above, since the voltage between the base and the emitter of the first transistor 18 is held at a nearly constant voltage, 0.65 volt, due to the transistor characteristics the base-emitter circuit of the first transistor 18 performs as the reference voltage means.

The collector current of the first transistor 18 is determined by the difference voltage between the back E.M.F. at the detecting terminals and the reference voltage $E_r$ between the base and the emitter of the first transistor 18. The current flowing through the fifth resistor 20 is divided into the collector current of the first transistor 18 and the base current of the second transistor 19.

Therefore, if the speed of rotation is accidentally reduced below the reference speed, the collector current of the first transistor 18 decreases automatically so as to increase the base current of the second transistor 19. Accordingly, the collector current of the second transistor also increases. The base current of the power control transistor 8 increases owing to the increased collector current of the second transistor 19 through the eighth resistor 24. Therefore, the current $I_0$ flowing into the bridge circuit 5 also increases with an increase in the base current of the power control transistor 8 so as to increase the current $I_a$ flowing through the D-C motor. Accordingly the generated torque increases and the rotating speed of the D-C motor approaches the reference speed.

The sixth resistor 21 and the capacitor 22 are inserted in order to prevent the undesirable high frequency oscillation of the amplifier 7.

Figure 3:
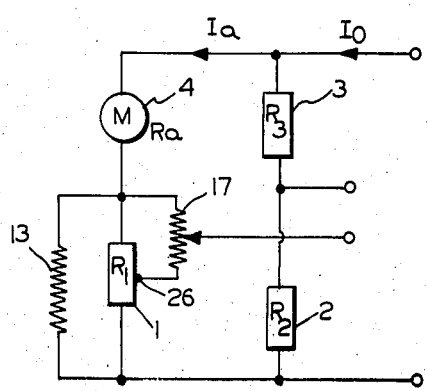
FIG. 3 is a partial circuit diagram of a modification of the circuit shown in FIG. 2.

An embodiment of the voltage dividing means is illustrated in FIG. 3, as another example. Referring to FIG. 3, the parts are designated by the same reference numerals as those of FIG. 1 and perform essentially the same functions as the parts in FIG. 1. The first resistor 1 is divided into two parts by a tapping point 26. The input terminals of the potentiometer 17 are connected between said tapping point 26 and the junction point of the first resistor 1 and the D-C motor 4. The output terminal of the potentiometer 17 is connected to the input terminal of the amplifying means 7 through the reference voltage means. The output terminal of the potentiometer 17 is movable so that one of the detecting terminal points of the bridge circuit can be changed in a manner similar to that of the potentiometer in FIG. 2. Thus the balancing state of the bridge circuit can be controlled. In the case of FIG. 3, the voltage dividing means has slightly different characteristics than that of FIG. 2. That is, if the tapping point 26 of the first resistor 1 is deviated toward the D-C motor 4 so that about ten percent of the total resistance of the first resistor 1 is included in the input terminal side of the potentiometer 17, the scope of movement of the detecting terminal and the total movement of the output terminal of the potentiometer 17 is ten percent of that in the case of FIG. 2. Therefore, it is possible to control the system with a ten times greater accuracy.

The values of the resistance of the first resistor 1, the second resistor 2, and the third resistor 3 are selected to be close to the balancing values for mass production, and thereby narrowing the balancing range. Therefore, it is sufficient to construct the variable device as shown in FIG. 3.

Figure 3A:
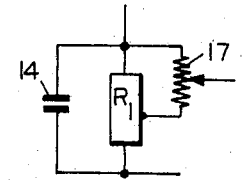
FIG. 3a is a partial circuit diagram illustrating a modified portion of FIG. 3.

It is also possible to shunt first resistor 1 with a capacitor 14, as shown in FIG. 3a, in the same manner as in FIG. 1a.

In order that the size of the total D-C motor control system may be kept small, it is required that the potentiometer be kept as small as possible. It is also required that the potentiometer have as low a power loss as possible.

The voltage applied to the potentiometer 17 shown in FIG. 2 is essentially the voltage across the first resistor 1 ($E_{R1}$). The power loss of the potentiometer 17 is $E_{R1}^2/R_p$, wherein $R_p$ is the total resistance of the potentiometer 17. When the voltage applied to the potentiometer 17 is about one-tenth of the voltage across the first resistor 1, the power loss of the potentiometer 17 is $$\left(\frac{E_{R1}}{10}\right)^2 \Big/ R_p$$

The power loss of the potentiometer 17 in the case of FIG. 3 becomes 1/100 of that in the case of FIG. 2. Therefore, by using the potentiometer 17 in the way shown in FIG. 3, the power loss of the potentiometer 17 becomes much smaller than that in FIG. 2, and it is possible to use a potentiometer having much smaller dimensions than that in FIG. 2.

A specific example of a circuit with specific elements is as follows (numbers in parentheses are reference numbers):

| | |
|---|---|
| Motor | ¹ MHE-5B. |
| Transistor (18, 19) | 2sc538. |
| Transistor (8) | 2sB324. |
| First resistor (1) | 7.7Ω (wire wound type). |
| Second resistor (2) | 1KΩ. |
| Third resistor (3) | 1.5KΩ. |
| Fourth resistor (13) | 70Ω. |
| Fifth resistor (20) | 10KΩ. |
| Sixth resistor (21) | 30Ω. |
| Seventh resistor (23) | 68Ω. |
| Eighth resistor (24) | 220Ω. |
| Ninth resistor (25) | 390Ω. |
| Potentiometer (17) | 50Ω. |
| Capacitor (20) | 0.05μf. |
| Capacitor (15) | 10μf. |
| Power source | 6.5~9.5 v. D-C. |

¹ Manufactured by Matsushita Electric Industrial Co., Ltd.

What is claimed is:

1. A D-C motor control system comprising a D-C motor, a first resistor, a second resistor and third resistor, said D-C motor, said first resistor, said second resistor and said third resistor being connected in a series circuit loop and in the recited order, said loop circuit constituting a bridge circuit, said first resistor having a resistance value slightly larger than the resistance value necessary for the true balance of the bridge, said first resistor having a tap terminal between the end terminals of said first resistor; a reference voltage means; a voltage dividing means for adjusting a balance of said bridge circuit means, said voltage dividing means having a pair of input terminals and an output terminal, said input terminals being coupled to one terminal of said first resistor and said tap terminal, and said output terminal being coupled to said reference voltage means; an amplifying means having a pair of input terminals and an output terminal, one terminal of said pair of input terminals being connected to said output terminal of said voltage dividing means through said reference voltage means and the other of said pair of input terminals being connected to the junction point of said second resistor and said third resistor; a power source having a first terminal and a second terminal, said second terminal being connected to the junction point of said first resistor and said second resistor; a power control transistor having a base connected to said output terminal of said amplifying means and an emitter-collector path of said power control transistor connected between said first terminal of said power source and said junction point of said D-C motor and said third resistor.

2. A D-C motor control system comprising a bridge circuit having a D-C motor, a first resistor, a second resistor and a third resistor, said D-C motor, said first resistor, said second resistor and said third resistor being connected in a series circuit loop and in the recited order; a power source having a first terminal and a second terminal, said second terminal being connected to a junction point of said first resistor and said second resistor; a first transistor, a second transistor and a power control transistor, said first transistor and said second transistor being the same type polarity and said power control transistor being the opposite type polarity, the emitter of said power control transistor being coupled to said first terminal of said power source, the collector of said power control transistor being coupled to the junction point of said D-C motor and said third resistor, the base of said power control transistor being coupled to the collector of said second transistor, the emitter of said second transistor and the emitter of said first transistor being coupled together to a junction point of said D-C motor and said first resistor, the base of said second transistor being coupled to the collector of said first transistor, a resistance coupled between said collector of said first transistor and said power source, the base of said first transistor being coupled to a junction point of said second resistor and said third resistor.

References Cited

UNITED STATES PATENTS

| | | | |
|---|---|---|---|
| 2,516,568 | 7/1950 | Haneiko | 318—331 |
| 2,689,320 | 9/1954 | Aloisio | 318—331X |
| 2,799,819 | 7/1957 | Brown | 318—331X |
| 2,814,012 | 11/1957 | Swanson | 318—331 |
| 3,229,182 | 1/1966 | Kubler | 318—331 |
| 3,309,596 | 3/1967 | Limley | 318—331 |
| 3,412,305 | 11/1968 | Kanner | 318—331 |
| 3,412,306 | 11/1968 | Fischer | 318—331 |

ORIS L. RADER, Primary Examiner

T. LANGER, Assistant Examiner

U.S. Cl. X.R.

318—332